(12) United States Patent
Oude Grotebevelsborg et al.

(10) Patent No.: US 11,383,472 B2
(45) Date of Patent: Jul. 12, 2022

(54) PRESS RAM FASTENING SYSTEM

(71) Applicant: ANAERGIA B.V., Oldenzaal (NL)

(72) Inventors: Willem Jan Oude Grotebevelsborg, Oldenzaal (NL); Carlo Gonella, Roccagrimalda (IT)

(73) Assignee: ANAERGIA B.V., Oldenzaal (NL)

( * ) Notice: Subject to any disclaimer, the term of this patent is extended or adjusted under 35 U.S.C. 154(b) by 158 days.

(21) Appl. No.: 16/083,138

(22) PCT Filed: Mar. 15, 2017

(86) PCT No.: PCT/EP2017/056087
§ 371 (c)(1),
(2) Date: Sep. 7, 2018

(87) PCT Pub. No.: WO2017/158000
PCT Pub. Date: Sep. 21, 2017

(65) Prior Publication Data
US 2019/0111647 A1   Apr. 18, 2019

Related U.S. Application Data

(60) Provisional application No. 62/310,327, filed on Mar. 18, 2016.

(51) Int. Cl.
*B30B 15/06* (2006.01)
*B30B 9/30* (2006.01)
*B30B 15/02* (2006.01)
*F16J 1/12* (2006.01)
*B30B 9/06* (2006.01)

(52) U.S. Cl.
CPC .............. *B30B 15/068* (2013.01); *B30B 9/06* (2013.01); *B30B 9/3021* (2013.01);
(Continued)

(58) Field of Classification Search
CPC ..... B30B 15/068; B30B 15/026; B30B 15/28; B30B 9/06; B30B 9/3021; B30B 9/305; F16J 1/10; F16J 1/12; F16J 1/14
(Continued)

(56) References Cited

U.S. PATENT DOCUMENTS 2,219,385 A * 10/1940 Ernst ..................... B30B 15/068
403/24
5,080,011 A   1/1992 Paxton et al.
(Continued)

FOREIGN PATENT DOCUMENTS

EP   1518454 A2   3/2005
FR   1378183 A   11/1964
(Continued)

OTHER PUBLICATIONS

International Patent Application No. PCT/EP2017/056087, International Preliminary Report on Patentability dated Sep. 27, 2018.
(Continued)

*Primary Examiner* — Shelley M Self
*Assistant Examiner* — Katie L. Parr
(74) *Attorney, Agent, or Firm* — Greer, Burns & Crain, Ltd

(57) ABSTRACT

A press for waste has an actuator (42) that moves a ram (40) in a chamber (30). The actuator and the ram are connected by a fastening system (100). The fastening system allows the ram to be displaced in a direction perpendicular to the length and direction of travel of the actuator. In this way, as inner surfaces of the chamber wear the ram may adjust to the worn surfaces without applying large forces perpendicular to the length of the actuator. When the actuator moves forward, it pushes directly against the back of the ram. When the actuator moves backwards, it pulls a pin (102) that pushes on an inner surface (108) of the ram.

6 Claims, 2 Drawing Sheets

(52) U.S. Cl.
CPC .......... *B30B 9/3096* (2013.01); *B30B 15/026* (2013.01); *F16J 1/12* (2013.01)

(58) Field of Classification Search
USPC ................................ 100/240, 245, 295, 902
See application file for complete search history.

(56) References Cited

U.S. PATENT DOCUMENTS

| | | | | |
|---|---|---|---|---|
| 6,790,022 | B1 * | 9/2004 | Foreman | .......... B29D 11/00413 |
| | | | | 425/135 |
| 7,134,314 | B1 * | 11/2006 | Peterson | ............... B30B 15/068 |
| | | | | 72/455 |
| 2008/0115557 | A1 * | 5/2008 | Hansen | ................. B30B 15/068 |
| | | | | 72/455 |
| 2014/0360388 | A1 * | 12/2014 | Aoki | ....................... B30B 1/181 |
| | | | | 100/289 |

FOREIGN PATENT DOCUMENTS

| | | | | | |
|---|---|---|---|---|---|
| JP | | H0624766 | A * | 1/1994 | ........... B30B 15/068 |
| JP | | H072534 | A * | 1/1995 | ............. C03B 11/08 |
| WO | WO-2011125938 | A1 * | 10/2011 | ............... B30B 1/38 |

OTHER PUBLICATIONS

International Patent Application No. PCT/EP2017/056087, International Search Report and Written Opinion dated Jul. 19, 2017.

\* cited by examiner

PRESS RAM FASTENING SYSTEM

CROSS-REFERENCE TO RELATED APPLICATIONS

This application is a National Stage Entry of International Application No. PCT/EP2017/056087, filed Mar. 15, 2017, which is a non-provisional application of U.S. Application Ser. No. 62/310,327, filed Mar. 18, 2016. International Application No. PCT/EP2017/056087 and U.S. Application Ser. No. 62/310,327 are incorporated by reference.

FIELD

This specification relates to presses, for example a machine for pressing solid waste to separate a wet fraction from a dry fraction.

BACKGROUND

Solid waste includes, for example, municipal solid waste (MSW), source separated organics (SSO) and waste from industrial, commercial and institutional (ICI) sources. The waste can de divided into various fractions. For example, organic waste is the part of the waste that is most easily biodegraded. Organic waste is primarily made up of food waste, but may also include leaf and yard waste or other materials. The organic waste fraction is approximately 40% of ordinary MSW after recyclables are removed. SSO may have an organic waste fraction of 80% or more and ICI wastes can have varying amounts of organic material.

Historically, organic waste was landfilled with other solid waste. However, the organic fraction of solid waste is the major cause of greenhouse gas emissions, leachate and odors in landfills. There is a general trend to divert organic waste for biological treatment, for example by anaerobic digestion (AD) or composting. Most biological treatment steps require some preprocessing of the waste such as debagging and sorting to remove large items such as bottles and cans. Certain biological treatments, such as some composting methods and high-solids slurry and wet (low solids) anaerobic digestion, also require that the waste be reduced in size and homogenized. The size reduction is typically done in a device that comminutes the waste, such as a hammer mill, shredder or pulper. In some cases, the comminuting device also provides a coarse separation of contaminants (i.e. material that is not readily biodegraded, such as plastic). Alternatively, a separate separation device may be added. With adequate processing, at least some of the non-organic waste may be used, for example as refuse derived fuel (RDF), rather than landfilled.

Recently, there have been various attempts to use presses to separate solid waste into organic and non-organic fractions. The organic fraction may also be called a wet fraction and the non-organic fraction may also be called a dry fraction. In general, the solid waste is loaded into a chamber having a porous wall. A hydraulic ram compresses the waste, which causes liquids and soft materials (i.e. food waste) to be squeezed through the porous wall. Large pieces of primarily non-organic waste are retained in the chamber. The retained fraction, also called the dry fraction, can also include materials, such as wood, that are organic but would be difficult to digest. The retained waste is rejected through a door of the chamber. In some (but not all) cases the pressure of the ram is enough to break open cell walls in the organic waste that is squeezed through the porous wall.

US Publication 2013/0316428 describes one process in which an organic fraction is separated from solid waste in a press. The organic fraction, alternatively called the wet fraction, is extruded through a grid having small-bore holes, under a pressure higher than the burst pressure of the cell membranes. The cells are disrupted and a gel or paste of a doughy consistency is produced. The gel can be digested in an anaerobic digester. Some examples of presses are described in European Publication Nos. 1207040 and 1568478, International Publication WO 2010/097177, and Italian patent application ITTO20111068. Commercially available presses include, for example, the Biosqueeze press sold by Finsterwalder and the VM 2000, Orex and Biorex presses sold by DB Technologies or Anaergia.

INTRODUCTION TO THE INVENTION

This specification relates to a fastening system for a press useful, for example, for separating solid waste into wet and dry fractions. The solid waste is loaded into a press chamber with one or more porous walls and compressed by a ram to squeeze the wet fraction out of the chamber. Later, a door of the chamber is opened and the retained waste is pushed out of the chamber. The fastening system is used to connect an actuator to the ram.

In a fastening system described in more detail below, the head of the ram is not attached to the actuator by a common fixed piston rod fastener such as a flange, ball joint, clevis or universal joint. Instead, the fastening system has a pin extending from the actuator through a clearance hole (a hole larger in diameter than the diameter of the pin) in part of the ram. The actuator pushes against the ram directly, i.e. without transferring force through the fastening system, to squeeze waste in the press. On the return stroke, the actuator pulls on the ram through a pin that bears on an inside surface of the ram.

In a preferred example, the pin bears on an inside surface of the ram through a pair of plates. The adjacent surfaces or the plates have corresponding non-planar shapes. For example, the adjacent surfaces of the plates may be a (truncated) cone and a corresponding inverted (truncated) cone.

DETAILED DESCRIPTION

Figure 1:
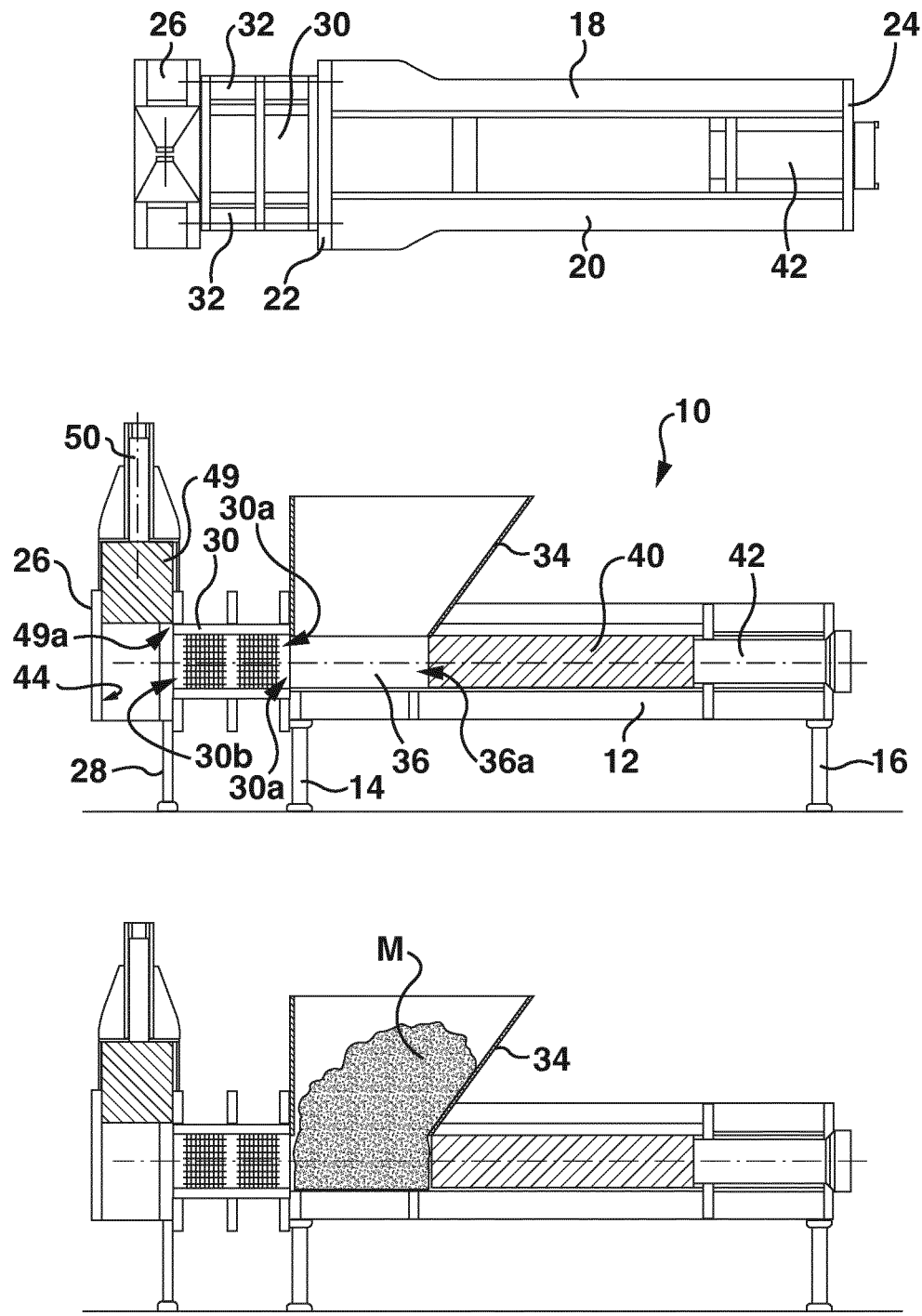
FIG. 1 is a reproduction of FIGS. 1 to 3 from International Publication Number WO 2010/097177.

Solid waste may be, for example, municipal solid waste (MSW), source-separated organics (SSO), industrial, commercial and or institutional waste (ICI), or a mixture of one or more of these or other wastes. Optionally, the waste may be pre-processed to some extent, for example to open bags, to roughly homogenize the waste or to remove very large pieces of waste, metals, or other recyclables.

The waste is then further processed in a press. The press compresses the waste in a chamber. An organic fraction of the waste, alternatively called the wet fraction, is squeezed through perforations in at least one wall of the chamber. The perforations may be, for example, 4 to 8 mm diameter circular holes. Retained waste, optionally called a dry fraction or non-organic fraction, is initially retained in the chamber. The retained waste is ejected from the chamber after opening a door of the chamber. Presses that treat municipal solid waste (MSW) preferably operate at high pressures, for example 180 to 220 bar. Presses that operate at lower pressures, for example in a range of about 50 to 150 bar, may be preferred for SSO and ICI waste having high water content.

The pressed organic waste is typically a viscous paste or slurry with a 20-35 wt % solids content, for example 20-25% when pressing wet commercial waste and 30-35% when pressing residential MSW. The pressed organic waste typically has a 85-95% volatile solids to total solids ratio. The non-volatile solids include floatables (for example small pieces of plastic foil or paper) and grit. The pressed organic waste can be treated further, for example a wet or dry anaerobic digester, or converted into compost or other biosolids.

The inventors have observed that solid waste presses suffer from a variety of practical problems. A press operates under very high pressure. To minimize leaks, very little space, for example 1 mm or less, is provided around moving parts. The solid waste contains minor amounts of grit such as sand or broken glass. When grit is entrained in waste pressurized in the press, the waste becomes abrasive and some of it leaks into the gaps around moving parts. Moving parts, and surfaces exposed to moving parts, therefore wear down over time.

One particular issue involves the connection between an actuator, for example a piston from a hydraulic cylinder, and the ram. As parts of the press wear down, the ram can move out of alignment relative to the actuator. Although the misalignment may be small, the force on the ram is large. As a result, wear is accelerated and the connection between the actuator and the ram can break.

In a ram described in more detail below, the head of the ram is not attached to the actuator by a common fixed piston rod fastener such as a flange, ball joint, clevis or universal joint. Instead, a fastening system has a pin extending from the actuator through a clearance hole in part of the ram. Preferably, an abutment is attached to the pin inside the ram. The actuator pushes against the ram directly, i.e. without transferring force through the fastening system, to squeeze waste in the press. On the return stroke, the actuator pulls on the ram through the pin.

For context, FIG. 1 shows a press described in International Publication Number WO 2010/097177, Machine for Processing the Organic Fraction of Urban Solid Waste, which is incorporated by reference. In this device, a ram (pressing member 40) compresses waste in a perforated rectilinear tube 30, which provides a pressing chamber. A door (shutting means 49) moves downwards to close the end of tube 30 while the waste is being compressed. A liquid fraction of the waste is squeezed out though the perforations in tube 30. The door 49 then moves upwards, which allows pressing member 40 to eject the remaining solid fraction out of the tube 30. The pressing member 40 is then pulled back to allow more waste to be loaded into the press. An actuator (piston driving means 42) moves the pressing member 40.

Figure 2:
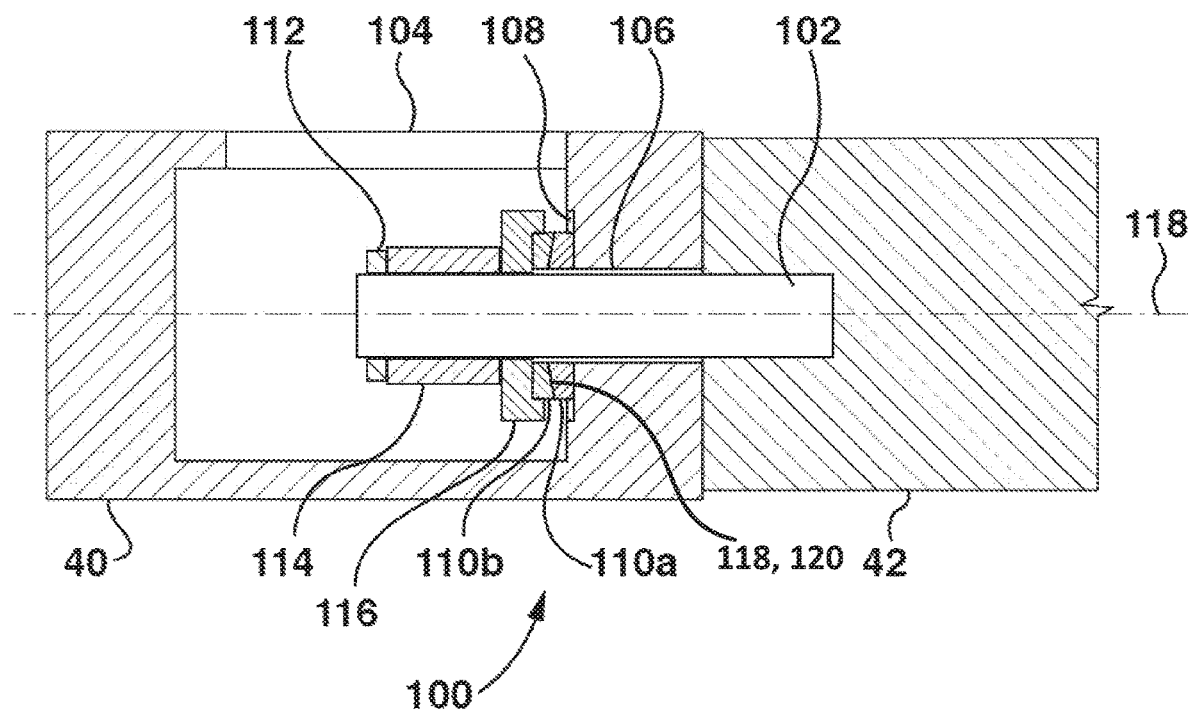
FIG. 2 is a schematic cross-section of a fastening system between an actuator and a ram.

FIG. 2 shows a fastening system 100 between an actuator 42 (such as a piston from a hydraulic cylinder) and a ram 40. The fastening system includes a pin 102. One end of pin 102 is attached to the end of the actuator 42. In the example shown, a hole in the end of the actuator 42 is tapped, the pin 102 is threaded and the pin 102 is screwed into the actuator 42. Alternatively, the pin 102 could be press fit into a hole in the actuator 42 or welded to the actuator 42. Part of the pin 102 extends from the actuator 42 and passes through a clearance hole 106 in the ram 40. The clearance hole 106 is larger in diameter than the pin 102, for example by 2 mm or more. A second end of pin 102 inside of ram 40 is accessible through an opening 104 in the ram 40.

The second end of pin 102 cannot pass through clearance hole 106. When the actuator 42 moves into the chamber to press waste (to the left in FIG. 2), the actuator 42 pushes against the ram 40. When the actuator 42 moves out of the chamber (to the right in FIG. 2), the actuator 42 pulls on the pin 102 and the pin 102 pushes against the inner surface 108 of ram 40. The clearance hole 106 provides tolerance for axial misalignment of the ram 40 and actuator 42, i.e. displacement of the ram 40 perpendicular to an axial line 118 through the actuator 42.

The basic action described above can be achieved by any abutment formed in the second end of the pin 102, or attached to the second end of the pin 102, that can bear against the inside surface 108 of ram 40. However, it is preferable for the pin 102 to bear against the inside surface 108 of the ram through a pair of plates 110. The plates 110 press against each other through adjacent surfaces. The adjacent surfaces are preferably not flat. In the example shown, a first plate 110a has a flat surface that bears against inside surface 108 and a truncated conical surface 118 that bears against the second plate 110b. The second plate 110b has a corresponding inverted truncated conical surface 120 that bears against the conical surface of first plate 110a. The second plate 110b also has a flat surface that bears against a nut 112 threaded on the second end of pin 102. In the example shown, the nut 112 bears on the second plate 110b indirectly through an extension ring 114 and cover 116.

The cover 116, though optional, helps hold the second plate 110b in a fixed position relative to the pin 102. The first plate 110a is relatively mobile in that it can slide across the inside surface 108 of ram 40. Over repeated cycles of advancing and retracting the ram 40, axial misalignment of the ram 40 and actuator 42 is compensated for by the fastening system 100. While the ram 40 is retracted, the second plate 110b may slide laterally over the first plate 110a. When the ram 40 is advanced, the first plate 110a may slide back to being concentric with the second plate 110b.

If the chamber that the ram 40 operates in becomes worn, the ram 40 may be displaced from the axial centerline 118 through the actuator 42. The fastening system 100 adapts to the misalignment, which avoids transferring forces perpendicular to the axial centerline 118 to the actuator 42. This helps prevent damage to the actuator 42, parts that hold the actuator 42 and the fastening system 100. Do to the large pressures possible in a press, even 1 mm of axial misalignment could otherwise damage these parts.

We claim:
1. A press comprising:
a chamber;
a ram;
an actuator;
a fastening system connecting the ram to the actuator, the fastening system having a pin extending along an axial centerline of the ram and the actuator and from the actuator through a clearance hole in the ram and an abutment inside the ram, the abutment being attached to or part of the pin or both, wherein the abutment projects beyond the clearance hole and an end of the pin is enclosed by the actuator; and
first and second plates between the abutment and an inside surface of the ram, said first and second plates having corresponding non-planar adjacent surfaces, wherein said non-planar adjacent surfaces are truncated conical and inverse truncated conical adjacent surfaces, wherein the actuator pushes the ram forward into the chamber when the actuator moves into the chamber, and wherein the actuator retracts the ram from the chamber by pulling on the ram through the pin.

2. A method of operating a press comprising steps of:

advancing a ram into a chamber by pushing an actuator against the ram, wherein a pin connects the actuator to the ram, the pin including an end enclosed by the actuator and extending along an axial centerline of the actuator and the ram; and retracting the ram from the chamber by retracting the actuator, wherein the pin moves laterally in a clearance hole in the ram to account for lateral displacement of the ram relative to the actuator, wherein when the actuator is retracting, the pin extending from the actuator into the ram pulls against an inner surface of the ram through a pair of plates having corresponding non-planar adjacent surfaces to retract the ram.

3. The method of claim 2, wherein when the ram is advancing, the actuator pushes directly against the ram.

4. The press of claim 1, wherein the end of the pin is attached to the actuator.

5. The press of claim 1, wherein the pin extends into the actuator.

6. A method of operating a press comprising steps of:

advancing a ram into a chamber by pushing an actuator against the ram, wherein a pin connects the actuator to the ram, the pin including an end enclosed by the actuator and extending along an axial centerline of the actuator and the ram; and retracting the ram from the chamber by retracting the actuator, wherein when the actuator is retracting, the pin extending from the actuator into the ram pulls against an inner surface of the ram through a pair of plates having corresponding non-planar adjacent surfaces to retract the ram, and wherein the corresponding non-planar adjacent surfaces are truncated conical and inverse truncated conical adjacent surfaces.

* * * * *